UNITED STATES PATENT OFFICE.

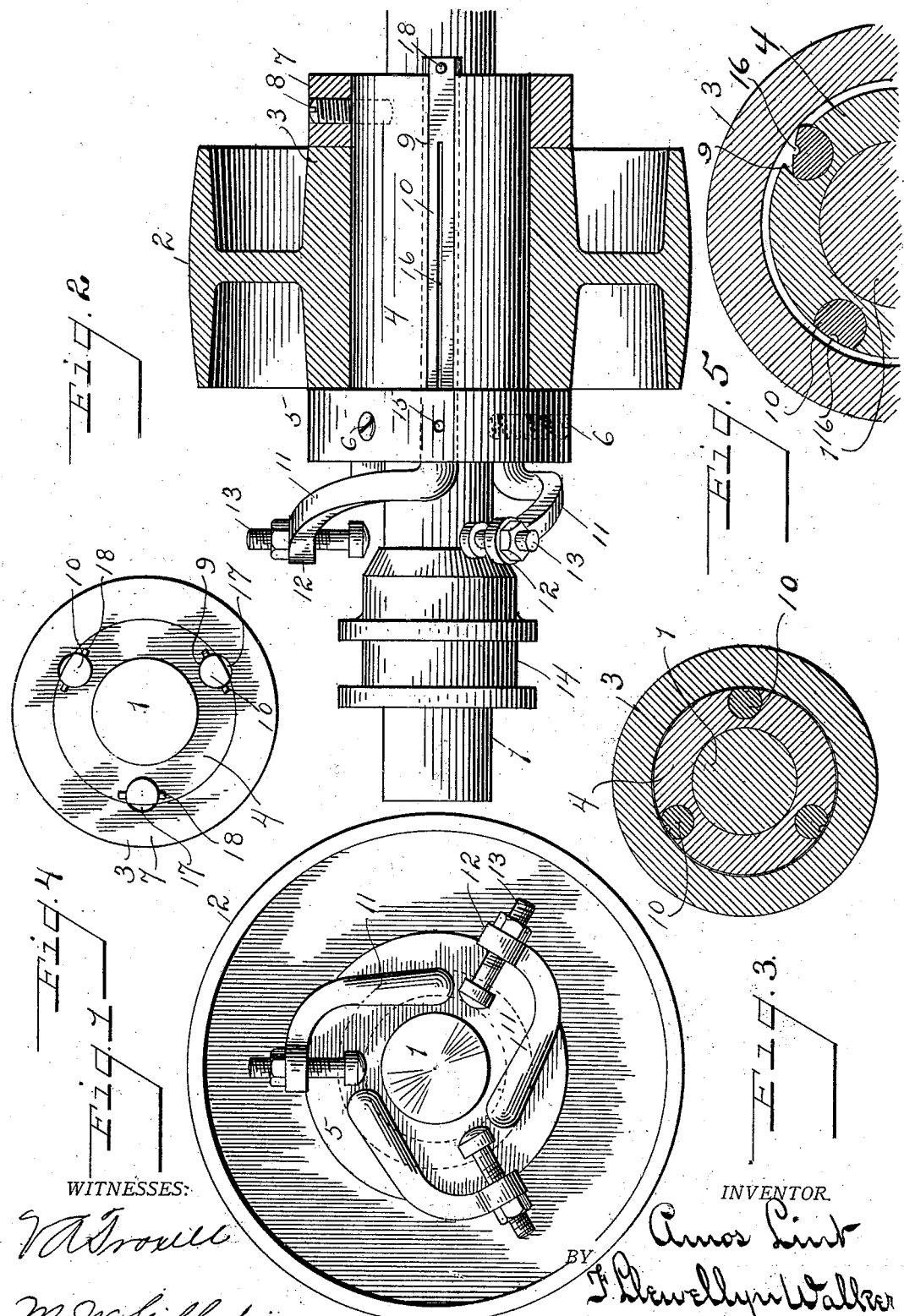

AMOS LINT, OF DAYTON, OHIO, ASSIGNOR OF ONE-HALF TO DAVID P. CLARK, OF DAYTON, OHIO.

FRICTION-CLUTCH.

No. 928,871.      Specification of Letters Patent.      Patented July 20, 1909.

Application filed January 31, 1908. Serial No. 413,525.

*To all whom it may concern:*

Be it known that I, AMOS LINT, a citizen of the United States, residing at Dayton, in the county of Montgomery and State of Ohio, have invented certain new and useful Improvements in Friction-Clutches, of which the following is a specification.

My invention relates to clutches and particularly to friction clutches, particularly adapted to use in light running machinery, but capable of being constructed of proportions suitable for heavy work.

The object of the invention is to greatly simplify the construction as well as the means and mode of operation of such devices, whereby they will not only be cheapened in construction, but will be more efficient in operation, easily operated, and unlikely to get out of repair.

A further primary object is to provide a clutch of compact construction, adapted to be used on small machinery where but limited room is available, and in which the engagement of the parts will be in a plane common with the point of application of the power, and further one adapted to be engaged at any point of rotation with a minimum movement of the parts.

With the above primary and other incidental objects in view as will appear from the specification, the invention consists of the means, mechanism, construction, and mode of operation, hereinafter described and set forth in the claims.

In the drawings Figure 1 is an end elevation of the assembled device. Fig. 2 is a longitudinal sectional view of the assembled clutch. Fig. 3 is a detail transverse sectional view. Fig. 4 is an end view, opposite that of Fig. 1. Fig. 5 is a sectional detail view, grossly exaggerated, showing the rods in both positions.

Like parts are indicated by similar characters of reference throughout the several views.

Referring to the drawings 1 is the shaft, 2 is a pulley of ordinary construction, of which 3 is the hub having a smooth straight bore concentric with the rim thereof and also with the shaft 1. It is obvious that in place of the pulley 2 a gear wheel or pinion may be substituted.

A sleeve 4 is secured on the shaft 1, which sleeve is provided with a peripheral flange 5. The sleeve 4 is secured to the shaft 1 in any suitable manner, but preferably by means of set screws 6. The pulley 2 is journaled on the sleeve 4, being secured in place by the integral flange 5 on one side and by a removable collar 7 on the opposite side. The collar 7 is secured by a set screw 8 engaging the sleeve 4, and preferably although not necessarily extending through said sleeve into engagement with the shaft 1 as indicated.

Located in the sleeve 4 are one or more longitudinal bores 9 which extend through the flange 5 and longitudinally through the sleeve 4, intersecting the periphery thereof, thus forming throughout the sleeve a series of grooves. Located in each of the longitudinal bores 9 is an oscillating gripping rod 10. The rods 10 are somewhat eccentric in cross section, the said rods being fitted to and oscillating within the bores 9, the outer face of the respective rods being flattened, or formed with a curvature conforming to that of the periphery of the sleeve 4, whereby when said rods are in their normal, or disengaged position, the periphery of the sleeve 4 will present a continuous unbroken surface, upon which the pulley or gear 2 will freely rotate.

The portion of the rods 10 projecting beyond the flange 5 is bent at substantially right angles to the main portion of the rod, forming a rock arm 11 for each of said rods. The rock arm 11 terminates in a head 12, through which extends an adjustable stud 13 projecting radially with relation to the axis of the structure. A longitudinally moving cone 14 is mounted on the shaft 1, and when moved toward the sleeve 4 it is adapted to engage the respective studs 13 and force the rock arms 11 outward to oscillate the body of the rods 10 within the bores 9 of the sleeve 4, whereby said rods will be caused to project slightly beyond the periphery of the sleeve 4 and frictionally engage the smooth interior bore of the hub 3 of the pulley or gear.

On account of the close running fit of the hub 3 on the sleeve only a very slight movement of the rods 10 is required to bind the hub upon the sleeve in such manner that the parts will rotate in unison. Located in the flange 5 is a plurality of oil holes 15, one for each rod 10. The respective oil holes 15 intersect a groove 16 in the face of the rod 10, which tends to distribute the lubricant within the smooth bore of the hub 3. By this construction, when the pulley or gear is being used as the driving member, and the shaft 1 as the driven member, the bearing of the hub 3 may be lubricated without stopping the driver.

In Fig. 5 the clearance of the hub and sleeve has been grossly exaggerated in order to better show the movement of the rods 10 into engaging position. It is to be understood that the hub 3 is journaled on the sleeve in the ordinary manner, having a running fit with the usual amount of clearance.

It will be seen that in the above described construction, the frictional engagement of the parts is in a direct plane with the "pull" of the driver, and that the engagement is in extent substantially all the way from one face to the other. This renders the clutch very compact, and permits its use in very limited space. The structure is not dependent on one point of engagement with the hub or any number of definite points but may be engaged with the hub at any point of the rotation. The clutch features are further capable of being fitted to any existing pulley or gear. It is further to be understood that either one or more rods 10 may be used, according to the work to be performed.

In order that the rods 8 may freely rotate in the bores 9 recesses 17 are formed in the interior periphery of the loose collar, 7, which recesses register with and complete the bores 9, as fully indicated in Fig. 4. Pins 18 in the ends of the rods 10 limit the end movement thereof.

From the foregoing description it will be apparent that I have provided a clutch mechanism comprising a driven member, which, in the present instance, consists of a shaft and a sleeve rigidly mounted thereon, and a driving member, which, in the present instance, consists of a pulley; and that the bearing surface of one of these members is provided with a longitudinal groove while the other of said members has a continuous bearing surface; that I have journaled in said longitudinal groove a rod of greater diameter than the depth of said groove; and that I have cut away that portion of the rod which extends beyond said bearing surface, thus reducing the diameter of the rod in one direction to an amount equal to or less than the depth of the groove. The shortest diameter of the rod is preferably equal to the depth of the groove and the rod serves as a portion of the bearing surface and provides a practically continuous bearing surface for this member. With the rod in this position it will be apparent that the sleeve may rotate in the pulley without in any wise affecting the same, but, when the sliding cone on the shaft has been actuated to rotate the rod about its longitudinal axis, a portion of the rod will be projected beyond the bearing surface of the member in which it is journaled and caused to frictionally engage the bearing surface of the other member, thereby securely locking the two members together and causing the same to rotate in unison.

From the above description it will be apparent that there is thus produced a clutch of the type described, possessing the particular features of advantage before enumerated as desirable, but which obviously is susceptible of modification in its form, proportion, detail construction, and arrangement of parts, without departing from the principle involved or sacrificing any of its advantages.

Having thus described my invention, I claim,

1. A clutch mechanism comprising a continuously rotating shaft, a sleeve rigidly mounted on said shaft and having a longitudinal groove in its outer surface, a hub provided with a continuous bearing surface and journaled on said sleeve, a rod rotatably mounted in said longitudinal groove, having its diameter in one direction equal to or less than the depth of said groove and having its diameter in another direction greater than the depth of said groove, whereby the rotation of said rod will cause a portion thereof to project beyond said groove and frictionally engage the bearing surface of said hub, and means independent of the means for actuating said hub for rotating said rod.

2. A clutch mechanism comprising a continuously rotating shaft, a sleeve rigidly mounted on said shaft and having a longitudinal groove in its outer surface, a hub provided with a continuous bearing surface and journaled on said sleeve, a rod rotatably mounted in said longitudinal groove, having its diameter in one direction equal to or less than the depth of said groove and having its diameter in another direction greater than the depth of said groove, whereby the rotation of said rod will cause a portion thereof to project beyond said groove and frictionally engage the bearing surface of said hub, a curved crank arm secured to one end of said rod, and a cone slidably mounted on said shaft and adapted to actuate said crank arm.

3. A clutch mechanism comprising a continuously rotating shaft, a sleeve rigidly mounted on said shaft and having a longitudinal groove in its outer surface, a hub provided with a continuous bearing surface and journaled on said sleeve, a rod rotatably mounted in said longitudinal groove, having its diameter in one direction equal to or less than the depth of said groove and having its diameter in another direction greater than the depth of said groove, whereby the rotation of said rod will cause a portion thereof to project beyond said groove and frictionally engage the bearing surface of said hub, a curved crank arm secured to one end of said rod, an adjustable stop carried by the outer end of said crank arm, and a cone slidably mounted on said shaft and adapted to engage said stop to actuate said crank arm.

4. A clutch mechanism comprising a shaft, a sleeve rigidly secured thereto and having a longitudinal groove therein, a collar rigidly secured to said sleeve at one end thereof and having an aperture therein extending longitudinally of said shaft and in alinement with said groove, a rod journaled in said aperture and in said groove, that portion of said rod lying in said groove having its outer portion cut away flush with the surface of said sleeve, a pulley journaled on said sleeve and having a continuous bearing surface, a crank arm connected to one end of said rod, and a member slidably mounted on said shaft and adapted to actuate said crank arm to rotate said rod and cause a portion thereof to be brought into frictional engagement with the bearing surface of said pulley.

5. A clutch mechanism comprising a shaft, a sleeve rigidly secured thereto and having a longitudinal groove therein, a collar rigidly secured to said sleeve at one end thereof and having an aperture therein extending longitudinally of said shaft and in alinement with said groove, a rod journaled in said aperture and in said groove, that portion of said rod lying in said groove having its outer portion cut away flush with the surface of said sleeve, said rod having a groove therein extending longitudinally of said sleeve, a radial recess in said collar adapted to register at its inner end with the groove in said rod, means for rotating said rod about its longitudinal axis, and a pulley mounted on said sleeve and having a continuous bearing surface, whereby the rotation of said rod will cause a portion thereof to frictionally engage the bearing surface of said pulley.

6. A clutch mechanism comprising a continuously rotating driving member, a driven member, one of said members being journaled upon the other, one of said members having a longitudinal groove in its bearing surface and the other of said members having a continuous bearing surface, a rod rotatably mounted in said groove, having its diameter in one direction equal to or less than the depth of said groove and having its diameter in another direction greater than the depth of said groove, whereby the rotation of said rod about its longitudinal axis will cause a portion thereof to project beyond said groove and frictionally engage the bearing surface of the other member, a crank arm secured to one end of said rod, and a device slidably mounted on one of said members and adapted to actuate said crank arm.

7. A clutch mechanism comprising a continuously rotating driving member, a driven member, one of said members being journaled upon the other, one of said members having a longitudinal groove in its bearing surface and the other of said members having a continuous bearing surface, a rod rotatably mounted in said groove, having its diameter in one direction equal to or less than the depth of said groove and having its diameter in another direction greater than the depth of said groove, whereby the rotation of said rod about its longitudinal axis will cause a portion thereof to project beyond said groove and frictionally engage the bearing surface of the other member, a crank arm, an adjustable stop carried by said crank arm, and a member slidably mounted on said shaft and adapted to engage said stop to actuate said crank arm.

8. A clutch mechanism comprising a shaft, a sleeve rigidly secured thereto and having a longitudinal groove therein, a collar rigidly secured to said sleeve at one end thereof and having an aperture therein extending longitudinally of said shaft and in alinement with said groove, a rod journaled in said aperture and in said groove, that portion of said rod lying in said groove having its outer portion cut away flush with the surface of said sleeve, a hub journaled on said sleeve and having a continuous bearing surface, means carried by said rod for moving the same about its longitudinal axis, and a member slidably mounted on said shaft and adapted to actuate said means to rotate said rod and cause a portion thereof to be brought into frictional engagement with the bearing surface of said pulley.

In testimony whereof, I have hereunto set my hand this 25" day of January A. D. 1908.

AMOS LINT.

Witnesses:
HARRY F. NOLAN,
F. L. WALKER.